Patented Feb. 16, 1937

2,070,922

UNITED STATES PATENT OFFICE 2,070,922

MANUFACTURE OF BAKED PRODUCTS

Joseph S. Reichert and William J. Sparks, Niagara Falls, N. Y., assignors to E. I. du Pont de Nemours & Company, Wilmington, Del., a corporation of Delaware No Drawing. Application January 29, 1934, Serial No. 708,907

15 Claims. (Cl. 99—90)

This invention relates to the preparation of edible baked goods and more particularly to peroxide leavened baked goods.

In the preparation of batters and baked products made therefrom, baking powder compositions have been used as the leavening agent. The constituents of this type of leavening agent, in the presence of the water used to make up the batter, react to generate carbon dioxide gas. Batters containing this type of leavening agent are not allowed to stand for any appreciable period prior to cooking for the reason that the gas begins to generate immediately on the addition of water, forming bubbles which escape from the batter during subsequent handling. This effect is somewhat disadvantageous for many purposes. For example, in the preparation of doughnuts by a doughnut-making machine it is necessary to mix only small amounts of batter at one time and even this does not give completely satisfactory results because the amount of leavening effect at the beginning is greater than near the end of the run. This variation in the leavening effect causes a corresponding variation in the characteristics of the baked product.

When a batter is prepared using hydrogen peroxide as a leavening agent, a similar effect is produced. However, the mechanism of the reactions involved and the cause are different than in the case of the baking powder batters. It appears that certain materials, probably catalases, occurring in varying amounts in all flours, cause the catalytic decomposition of hydrogen peroxide at ordinary room temperatures; thus the same undesirable effect is produced as with baking powders, namely the evolution of the gas prior to baking or frying. Further, if one prepares a batter using hydrogen peroxide leaven and then cooks the batter immediately, the baked products usually have soft, doughy unleavened centers. This unsatisfactory result appears to be caused by failure to obtain complete decomposition of the peroxide before the dough reaches the baking temperature.

In our copending application S. N. 655,680 now Patent No. 1,953,567, issued April 3, 1934, we have described and claimed a method of baking with hydrogen peroxide leaven whereby the dough or batter is allowed to stand or "proof" for a time prior to baking until the peroxide is substantially completely decomposed and then raising the mixture to the baking temperature. This method, while satisfactory for baking such products as bread or cake, is not entirely suitable for such processes as frying doughnuts with a machine or frying or baking waffles, griddle cakes, crackers and the like, where most of the batter in a given batch stands at room temperature over an extended period of time and from time to time small portions thereof are brought quickly to the baking temperature. For want of better terms, we designate this type of baking as "quick baking" and the products thereof as "quick baked products". In using hydrogen peroxide in this type of baking it is necessary that the leaven should not generate gas to an undue extent in the batter at ordinary temperatures and yet should quickly decompose when the batter is heated, so that the decomposition is substantially complete before the bulk of the batter has reached the baking temperature.

An object of the present invention is to provide an improved method for baking the above mentioned "quick baked products". A further object is to provide a satisfactory method for using a peroxide leaven in "quick baking" processes. A still further object is to provide a peroxide leavened dough or batter in which the peroxide decomposition is inhibited at room temperature but is accelerated at elevated temperatures below the baking temperature. Other objects will be apparent from the following description.

We accomplish the desired result by utilizing hydrogen peroxide as a leavening agent within a controlled pH range in the batter and in conjunction with certain reagents which we believe act to destroy the effectiveness of stabilizing materials naturally present in flours, as explained more fully hereinafter. We have found that when such materials are added to a peroxide leavened dough or batter in suitable quantities, the peroxide in the dough is stable at room temperatures but is completely decomposed at elevated temperatures just below the baking temperature.

The term "baking temperature" as used herein refers to the temperature of the dough in the interior of a baked product at the time when the dough is converted to a palatable baked product. This baking temperature usually is close to about 100° C., while the exterior temperature, that is, the temperature of the oven or grease bath used to apply the heat ordinarily is much higher.

In experimenting with the use of hydrogen peroxide as a leavening agent, we have found that the decomposition of the peroxide in a dough mix is profoundly affected by naturally occurring substances in the flour. The rate of peroxide decomposition under given conditions will vary, depending on the nature and amounts of these substances in the flour used. These substances fall in three groups: (1) organic substances which catalyze peroxide decomposition, called "catalases", (2) inorganic peroxide decomposition catalysts and (3) stabilizing materials, which act to inhibit peroxide decomposition. We have found that the catalase effect of a flour may be inhibited or destroyed by (a) alkaline condition or (b) heating to a temperature above around 40 to 50° C. We have further found that by the addition of certain substances hereinafter specified to a peroxide leavened dough mix which has been treated with alkali to partly or completely destroy the catalase, it appears that natural peroxide stabilizers in the flour are rendered partially or wholly ineffective. Furthermore, naturally occurring peroxide decomposition catalysts other than catalases, which are not destroyed by the alkali have little or practically no effect at ordinary temperatures, even when the dough is alkaline. However, the effect of these catalysts is increased on heating and this temperature effect is increased with rising pH. The result is that the peroxide in such a treated batter or mix is fairly stable at ordinary room temperatures, but is decomposed very rapidly when the temperature is increased, for example to 50° C. or higher. In accordance with our invention, a specific reagent is added to an alkaline, peroxide leavened dough mix which reagent appears to be capable of rendering ineffective the peroxide stabilizers naturally present in the flour from which the dough was made. We have found soluble carbonates, and to a lesser extent, phosphates to be suitable reagents for this purpose. Obviously a specific reagent, e. g. a carbonate, may serve a dual purpose in also being the alkalining agent.

In a peroxide leavened dough mix in which the catalase has been wholly or partially destroyed by alkalining and the natural peroxide catalysts have been rendered partially or wholly ineffective, the rate of peroxide decomposition depends chiefly on the presence of the peroxide decomposition catalysts other than catalases naturally occuring in the flour, the degree of alkalinity and the temperature. The degree of alkalinity affects the catalytic decomposition of the peroxide in such dough; the rate of decomposition increases as the pH is raised. This effect, however, ordinarily is rather small at room temperature but increases many-fold as the temperature is raised to 50 to 100° C.

The amount and kind of inorganic peroxide decomposition catalysts present will vary for different cereal flours, depending on the kind and variety of grain from which the flour was milled and the milling grade of the flour. If desired, this catalytic effect may be modified by adding to the dough catalytic inorganic salts. We have found that salts of heavy metals are suitable for this purpose, for example, soluble salts of copper, cobalt, iron or manganese. Very small amounts of these are required to produce the desired effect, for example 0.1 to 1.0 milligrams per pound of dough mix.

In preparing the baked products according to our invention, the usual ingredients for the product to be prepared are used with the exception of baking powder or its equivalent. In place of the baking powder leaven we substitute a suitable amount of hydrogen peroxide or equivalent active oxygen compound and add an alkalining agent in an amount sufficient to produce the desired peroxide stabilization at room temperature together with the reagent which renders ineffective the peroxide stabilizers, for example a soluble carbonate. The amount of peroxide used will vary with the degree of leavening desired and with the kind and grade of flour used. In general, we add hydrogen peroxide solution equivalent to not more than 0.5 to 2% of $H_2O_2$, based on the weight of the flour used. The time required for baking is approximately equal to the time required for baking baking powder products.

We have found that a temperature slightly higher than that ordinarily used is beneficial in producing a good brown color in the finished article. The amount of peroxide added is regulated so that the amount of oxygen given off will give the desired leavening effect to the finished product.

If desired other per-compounds, which readily decompose to release gaseous oxygen may be used in place of or in addition to hydrogen peroxide to leaven the dough. For example, various inorganic and organic peroxides, e. g. sodium peroxide, urea peroxide, benzoyl peroxide and the like and various per-salts, e. g. perborates and percarbonates may be used to leaven the dough. Herein, and in the appended claims, we use the term "peroxide leavened" to designate dough or baked products leavened with hydrogen peroxide or equivalent per-compounds.

Various alkaline materials which are not harmful or unwholesome in the amounts required may be used to make the dough alkaline in accordance with our invention. For example, alkali metal hydroxides, alkaline earth hydroxides, alkaline salts and the like are suitable. Likewise various alkaline per-compounds may be used, e. g. alkali or alkaline earth metal peroxides or alkali metal per-salts. These may be used alone or in conjunction with other alkaline materials. We prefer to add sufficient alkali to adjust the alkalinity to a pH of 8 to 10.

In one method of practicing our invention, alkali metal carbonate is added to the peroxide leavened dough mix in sufficient amounts to make the mixture alkaline. Preferably, for making "quick-baked" products, we add sufficient of the carbonate to adjust the alkalinity to a pH value of 8 to 10. Care should be taken that the alkalinity is not too high, for at high alkalinities, e. g. a pH of around 10 to 13, there is a tendency for the development of an undesirable taste in the product. In place of alkali metal carbonate alone, another alkali, e. g. sodium hydroxide may be used in addition to the carbonate, or alkali metal bicarbonate may be used in conjunction with a strong alkali such as sodium hydroxide. We prefer not to use alkali metal bicarbonate alone because it imparts a salty taste when used in amounts required to produce the desired alkalinity.

*Example I*

Doughnuts were prepared according to the following recipe:

Materials

| | | | |
|---|---|---|---|
| Sugar | 71 grams | Salt | 2 grams |
| Crisco | 7 grams | Flour | 210 grams |
| Mace | 1 gram | Milk | 100 cc. |
| Egg | 1 gram | Hydrogen peroxide (100 volume strength) | 4.5 cc. |
| Vanilla | | Sodium carbonate | 1.5 grams |

Procedure

Cream the shortening with about one fifth of the sugar and add the mace, vanilla and salt. Then slowly work another two fifths of the sugar into the creamed shortening. Beat the egg and slowly mix the remaining sugar with the egg foam. Combine the creamed shortening mixture with the egg foam and mix thoroughly. Add the peroxide to the milk and add the resulting solution to the above mixtures, breaking up the mass thoroughly by stirring. Slowly add the sifted flour, while stirring. Transfer the dough to the molding machine and deposit into the frying grease. Fry for 1 minute in grease maintained at 200° C., then turn and fry on the other side for 1 minute. Remove from the grease and place in a cooling tray.

Doughnuts having a volume weight ratio of 2.2 to 2.4 ccs. per gram were obtained by the above procedure. The grease absorption was slight and no undecomposed peroxide remained in the final product. Tests on the dough stored at room temperature gave a positive reaction for peroxide after standing for 1 hour. Portions of the dough were allowed to stand for 15 and 30 minutes before frying. The doughnuts resulting had a volume of 2.4 ccs. per gram and were equally as good as the product obtained by frying immediately after mixing the batter.

*Example II*

10 grams of "Gold Medal" brand cake flour were mixed with 50 cc. of 2 volume hydrogen peroxide with, and without the addition of sodium carbonate. In tests 1 and 3, 0.75 gram of sodium carbonate dissolved in the hydrogen peroxide was added and in tests 2 and 4 no carbonate was added. The volume of oxygen gas evolved from the mixture was measured at various intervals at constant temperature and the per cent decomposition of the hydrogen peroxide was computed from these measurements. The per cent decomposition of hydrogen peroxide at 1, 2, 3, 4, 10 and 15 minutes is given in the following table:

| Test | 1 With $Na_2CO_3$ | 2 Without $Na_2CO_3$ | 3 With $Na_2CO_3$ | 4 Without $Na_2CO_3$ |
|---|---|---|---|---|
| Temperature | 25° C. | 25° C. | 75° C. | 75° C. |
| Decomposition of $H_2O_2$ in: | | | | |
| 1 min | 1.0% | 8.8% | 38.0% | |
| 2 mins | 2.0% | 18.0% | 76.0% | |
| 3 mins | 3.8% | 23.5% | 94.0% | |
| 4 mins | 5.0% | 27.6% | 100.0% | |
| 10 mins | | 42.0% | | 1.5% |
| 15 mins | 15.2% | 50.0% | | |

A comparison of test 1 containing 0.75 gram sodium carbonate with test 2 containing no carbonate, both tests being carried out at 25° C., shows that the sodium carbonate inhibits the catalase action of the flour so that the decomposition is materially lessened. When, however, mixtures containing sodium carbonate and mixtures containing no sodium carbonate are maintained at 75° C. (tests 3 and 4), the opposite effect is shown. In fact the composition containing no carbonate showed substantially no decomposition in 10 minutes whereas the composition containing sodium carbonate was completely decomposed in less than 4 minutes. It is apparent from this experiment then that by the use of sodium carbonate we can control the leavening process so that substantially no decomposition of the leavening agent occurs at room temperature and rapid and complete decomposition of peroxide occurs at temperatures approaching baking temperatures.

*Example III*

50 ccs. of 2-volume hydrogen peroxide was added to 10 grams of Gold Medal flour and the alkalies indicated below were added to the mixture. The mixture was then heated to 75° C. and the oxygen evolved was measured. The following table shows the results of these tests:

| Test | Alkalining Agent | Decomposition | | | | pH |
|---|---|---|---|---|---|---|
| | | 2 min. | 5 min. | 10 min. | 15 min. | |
| 1 | $Na_2CO_3$ | 0.22% | 60.8% | 93.0% | 100.0% | 9.6 |
| 2 | NaOH | 4.8% | 14.4% | 26.0% | 35.2% | 10.6 |
| 3 | $Ca(OH)_2$ | 3.4% | 12.4% | 20.4% | 26.0% | 10.6 |
| 4 | None | 0.5% | 1.4% | 1.6% | 1.6% | 5.3 |

*Example IV*

A doughnut batter was prepared as in Example I with the exception that 10% of gluten flour was added to the cake flour used in Example I. The doughnuts were fried as before and the finished product was satisfactory, in fact this product was somewhat superior to the product of Example I in that the structure was somewhat finer and more uniform. Also, the tests showed that there was no undecomposed peroxide in the doughnuts which were fried immediately after mixing the batter. Satisfactory doughnuts also were made by allowing the dough batter to stand 10, 20 and 30 minutes before frying.

*Example V*

A doughnut batter was prepared by the procedure of Example I, using the following formula:

Sugar _____ grams __ 140
"Crisco" vegetable fat _____ grams __ 14
Salt _____ grams __ 4
Mace _____ grams __ 2
Vanilla extract _____ cc. ___ 1
Trisodium phosphate
  ($Na_3PO_4.12H_2O$) _____ grams __ 4.5
Eggs _____ 2
Flour (Gold Medal Cake) _____ grams __ 425
Milk _____ cc. ___ 225
Hydrogen peroxide (100 vol.) _____ cc. ___ 9.0

This batter was fried by the procedure of Example I, at various intervals of time after mixing. Qualitative tests for the presence of hydrogen peroxide, using potassium iodide as reagent, were made on the dough at room temperature and on the fried product at various intervals of time.

This procedure then was repeated, except that in making the batter, trisodium phosphate was omitted and in its place sufficient sodium hydroxide was added to adjust the alkalinity of the batter to substantially the same value (pH of 8.5 to 9) as in the first bath.

The results obtained are tabulated below:

*Tests for hydrogen peroxide*

| Time after mixing | $Na_3PO_4$ batter | | NaOH batter |
|---|---|---|---|
| | Dough | Baked product | Baked product |
| 5 minutes | Positive | Positive | |
| 20 minutes | Positive | Negative | |
| 30 minutes | Positive | Negative | Positive. |
| 60 minutes | Positive | Negative | |

The doughnuts made from the phosphate-containing batter were of good taste and appearance. Those made from the batter alkalined with sodium hydroxide had a disagreeable taste and odor, due to undecomposed peroxide.

We claim:

1. A process for producing edible baked products without yeast or carbon dioxide evolving materials comprising preparing a cereal flour dough containing hydrogen peroxide as leavening agent, incorporating in said dough a soluble carbonate, adjusting the alkalinity of said dough to a pH of 8 to 10 and thereafter baking said dough.

2. A process for producing edible baked products without yeast or carbon dioxide evolving materials comprising preparing a cereal flour dough containing hydrogen peroxide as leavening agent, incorporating in said dough a soluble phosphate, adjusting the alkalinity of said dough to a pH of 8 to 10 and thereafter baking said dough.

3. A process for producing edible baked products without yeast or carbon dioxide evolving materials comprising preparing a cereal flour dough containing hydrogen peroxide as leavening agent, incorporating in said dough a soluble carbonate and an alkalining agent in sufficient amount to make the dough alkaline, the pH being below 10, and thereafter baking said dough.

4. A process for producing edible baked products without yeast or carbon dioxide evolving materials comprising preparing a cereal flour dough containing hydrogen peroxide as leavening agent, incorporating in said dough a soluble phosphate and an alkalining agent in sufficient amount to make the dough alkaline, the pH being below 10, and thereafter baking said dough.

5. A process for producing edible baked products without yeast or carbon dioxide evolving materials comprising preparing a peroxide leavened cereal flour dough, incorporating in said dough an alkali metal carbonate in sufficient amount to make the dough alkaline, the pH being below 10, and thereafter baking said dough.

6. A process for producing edible baked products without yeast or carbon dioxide evolving materials comprising preparing a cereal flour dough containing hydrogen peroxide as leavening agent, incorporating in said dough an alkali metal carbonate in sufficient amount to adjust the alkalinity of the dough to a pH of 8 to 10 and thereafter baking said dough.

7. A process for producing edible baked products without yeast or carbon dioxide evolving materials comprising preparing a cereal flour dough containing hydrogen peroxide as leavening agent, incorporating in said dough sodium carbonate in sufficient amount to adjust the alkalinity of the dough to a pH of 8 to 10 and thereafter baking said dough.

8. A peroxide leavened cereal flour dough suitable for baking to produce an edible baked product which dough has an alkaline reaction, the pH being below 10, and contains a suitable quantity of hydrogen peroxide to act as a leavening agent without yeast or carbon dioxide evolving materials and a soluble carbonate.

9. A cereal flour dough suitable for baking to produce an edible baked product which dough has an alkaline reaction, the pH being below 10, and contains a suitable quantity of hydrogen peroxide to act as a leavening agent without yeast or carbon dioxide evolving materials and a soluble phosphate.

10. A cereal flour dough suitable for baking to produce an edible baked product, which dough has an alkaline reaction, the pH being below 10, and contains a suitable quantity of hydrogen peroxide to act as a leavening agent without yeast or carbon dioxide evolving materials and an alkali metal carbonate.

11. A cereal flour dough suitable for baking to produce an edible baked product, which dough has an alkaline reaction, the pH being below 10 and contains a suitable quantity of hydrogen peroxide to act as a leavening agent without yeast or carbon dioxide evolving materials and sodium carbonate.

12. A cereal flour dough suitable for baking to produce an edible baked product, which dough contains a suitable quantity of hydrogen peroxide to act as a leavening agent without yeast or carbon dioxide evolving materials and an alkali metal carbonate in sufficient amount to make the dough alkaline and of a pH below about 10.

13. A cereal flour dough suitable for baking to produce an edible baked product, which dough contains a suitable quantity of hydrogen peroxide to act as a leavening agent without yeast or carbon dioxide evolving materials and sodium carbonate in sufficient amount to adjust the alkalinity of the dough mix to a pH of about 8 to 10.

14. A process for preparing edible baked products without yeast or carbon dioxide evolving materials which comprises preparing a peroxide leavened cereal flour dough, incorporating therein a reagent selected from the group which consists of the soluble carbonates and phosphates, which reagent is capable of inhibiting decomposition of hydrogen peroxide at room temperature but which at the elevated temperature encountered during baking does not prevent complete decomposition of hydrogen peroxide, adjusting the alkalinity of the dough so that it corresponds to a pH falling within the range 8 to 10 and thereafter baking said dough.

15. A cereal flour dough having a pH falling within the range 8 to 10 and suitable for baking to produce an edible baked product, said dough containing a suitable quantity of hydrogen peroxide to act as the leavening agent, without yeast or carbon dioxide evolving materials, and a reagent selected from the group which consists of the soluble carbonates and phosphates, said reagent functioning to inhibit decomposition of hydrogen peroxide at room temperature but which at the elevated temperature encountered during baking does not prevent complete decomposition of hydrogen peroxide.

JOSEPH S. REICHERT.
WILLIAM J. SPARKS.